United States Patent [19]

Holtzen et al.

[11] Patent Number: 4,999,055
[45] Date of Patent: Mar. 12, 1991

[54] TIO$_2$ PIGMENTS RESISTANT TO DISCOLORATION IN THE PRESENCE OF POLYMER ADDITIVES

[75] Inventors: Dwight A. Holtzen; Austin H. Reid, Jr., both of Newark, Del.

[73] Assignee: E. I. du Pont de Nemours and Company, Wilmington, Del.

[21] Appl. No.: 404,730

[22] Filed: Sep. 6, 1989

Related U.S. Application Data

[63] Continuation of Ser. No. 151,672, Feb. 3, 1988, abandoned.

[51] Int. Cl.$^5$ .............................................. C09C 1/36
[52] U.S. Cl. ................................ 106/436; 106/447; 524/413
[58] Field of Search ................ 106/436, 447; 524/413

[56] References Cited

U.S. PATENT DOCUMENTS

| | | | |
|---|---|---|---|
| 3,649,321 | 3/1972 | Durrant et al. | 106/308 F |
| 3,808,022 | 4/1974 | Twist et al. | 106/447 |
| 3,883,470 | 5/1975 | Bishop | 524/425 |
| 3,953,218 | 4/1976 | Pellard | 106/308 F |
| 4,154,622 | 5/1979 | Momoi et al. | 106/308 F |
| 4,209,430 | 6/1980 | Weber | 106/308 F |
| 4,375,989 | 3/1983 | Mäkinen | 106/447 |
| 4,563,221 | 1/1986 | Humphreys | 106/308 F |
| 4,599,114 | 7/1986 | Atkinson | 106/308 F |
| 4,670,491 | 6/1987 | Stretanski et al. | 524/413 |
| 4,741,780 | 5/1988 | Atkinson | 106/300 |
| 4,797,444 | 1/1989 | Cowles et al. | 524/413 |

OTHER PUBLICATIONS

Abstract; Author: Solvik, R. S.; Wu, W. C. L.; Krebaum, L. J.; Title: Control of Yellowing in High Density Polyethylene [PE] Pigmented with Titanium (IV) Oxide.

Primary Examiner—William R. Dixon, Jr.
Assistant Examiner—Willie J. Thompson

[57] ABSTRACT

An improved inorganic pigment (e.g., TiO$_2$), process for treating such pigment and polymer (e.g., polyethylene, polypropylene or polystyrene) incorporating such pigment wherein the inorganic pigment is coated with maleic, malonic, benzoic, fumaric, or phthalic acid or mixtures thereof. The coated pigments exhibit excellent resistance to polymer yellowing or discoloration and do not appear to degrade polymer properties.

9 Claims, No Drawings

TIO₂ PIGMENTS RESISTANT TO DISCOLORATION IN THE PRESENCE OF POLYMER ADDITIVES

This application is a continuation of application Ser. No. 07/151,672 filed Feb. 3, 1988 abandoned.

BACKGROUND OF THE INVENTION

Inorganic pigments, and especially $TiO_2$, are often incorporated in various polymers as opacifying agents. Also typically incorporated in such polymers are hindered amine light stabilizers ("HALS"); phenolic antioxidants (e.g., butylated hydroxytoluene, commonly referred to as "BHT", and related materials); flame retardants (e.g., $Sb_2O_3$); and UV stabilizers.

However, a common problem with the use of such pigments (and especially $TiO_2$ with such additives) is that the pigments can either promote the reaction of polymer additives with each other or react directly with one or more of the additives. These reactions lead to the formation of chromophores which usually reflect light in the yellow portion of the spectrum and hence produce a "yellowing" of the polymer. The aforementioned discoloration problem is especially apparent in white pigmented olefinic polymers.

While methods exist which somewhat inhibit the foregoing discoloration problem, they are deficient in one or more areas, e.g., they (1) can be expensive and/or complex to apply and/or (2) can cause deterioration of some polymer properties and/or cause processing problems such as difficulty in extruding the films or dispersing pigments in dry blends of the polymers.

The following information is disclosed which may be of interest to this invention:

U.S. Pat. No. 3,545,994 discloses masking the surface of $TiO_2$ by coating it with various metal oxides.

U.S. Pat. No. 3,904,565 discloses a polymer color inhibitor consisting of a mixture of a fatty acid salt, a polyalkeneglycol ether, and thiobisphenol.

U.S. Pat. No. 3,673,146 discloses the use of triorganophosphites to inhibit polymer discoloration.

U.S. Pat. No. 4,054,522 discloses polymer color inhibitors consisting of esters of phosphorodihalous acids.

U.S. Pat. No. 4,357,170 discloses the use of a mixture of an organophosphate/alkanolamine addition product, and a polyol.

An article entitled "Discoloration of Pigmented Polyolefins" by D. A. Holtzen appeared in the April, 1977 issue of *Plastics Engineering* and discloses the use of zinc stearate to inhibit polymer discoloration.

SUMMARY OF THE INVENTION

In accordance with this invention there is provided inorganic pigment coated with an organic acid in the amount of about 0.01-6 percent, based on the weight of the inorganic pigment.

There is also provided by this invention a process for treating an inorganic pigment which comprises contacting it with an organic acid.

Finally, there is provided by this invention a polymer incorporating the pigment of this invention.

It has been found that the pigments of this invention have excellent resistance to polymer yellowing or discoloration and do not appear to degrade important polymer properties or cause problems in the processing of the polymer. The process for producing the pigments of this invention is also inexpensive and can be easily carried out in the pigment manufacturing process or the polymer blending or formulating process.

DETAILED DESCRIPTION OF THE INVENTION

Any suitable organic acid can be used to produce the pigments of this invention. While organic acids can be used which have one acid group, preferably the organic acid will have two or more acid groups. An especially preferred organic acid has two or more acid groups which are adjacent each other in the cis position. Preferably, the organic acid will have about 2-28, more preferably about 2-18, and most preferably about 2-12 carbon atoms. Other preferred organic acids are those having at least one carbon to carbon unsaturated group; such acids are especially useful for pigment to be incorporated in polymers of ethylenically unsaturated monomers. Generally, the organic acid should be present in an amount of about 0.01-6 percent, preferably about 0.05-4 percent, and most preferably about 0.1-3 percent, based on the weight of the inorganic pigment. Mixtures of acids can be used. If desired, the acid can be partially esterified, as long as an effective amount of acid groups remain to provide the benefits mentioned hereinabove.

Examples of suitable organic acids include maleic, malonic, stearic, benzoic, fumaric, phthalic, oleic, and linoleic. Preferred is maleic acid.

As used herein, the term "inorganic pigment" means opacifying and nonopacifying inorganic ingredients which are particulate and substantially nonvolatile in use, and includes those ingredients typically labeled as pigments, inerts, extenders, fillers or the like in the paint and plastic trade.

Representative inorganic pigments include rutile and anatase $TiO_2$, clays such as kaolin clay, asbestos, calcium carbonate, zinc oxide, chromium oxide, barium sulfate, iron oxide, tin oxide, calcium sulfate, talc, mica, silicas, dolomite, zinc sulfide, antimony oxide, zirconium dioxide, silicon dioxide, cadmium sulfide, cadmium selenide, lead chromate, zinc chromate, nickel titanate, diatomaceous earth, glass fiber, glass powder, glass spheres, and the like and mixtures thereof.

Titanium dioxide pigments are preferred. Especially preferred are rutile and anatase titanium dioxide having an average particle size of less than 5,000 Å and typically having a particle size of about 1,000–5,000 Å. The titanium dioxide pigments also may contain ingredients added thereto to improve the durability characteristics or other properties of the pigment. Thus, the $TiO_2$ pigments may contain hydrous oxides such as silica, alumina, tin oxide, lead oxide, chromium oxides, and the like.

Generally, the inorganic pigments can be treated by contacting them with one or more organic acids. The treatment can be carried out by immersing the pigment in the acid or a solution of the acid; spraying the pigment with the acid or solution of the acid; injecting the acid or solution of the acid into an air or steam pigment micronizer; and/or mixing the pigment and the acid or solution of the acid into the polymer and subjecting such mixture to further processing (such as extruding, milling, kneading, etc.) to attain contacting of the acid and pigment.

Polymers which are suitable for use in this invention include polymers of ethylenically unsaturated monomers; polyolefins such as polyethylene, polypropylene, polybutadiene, etc.; polyvinyls such as polyvinyl chloride, polyvinyl esters, polystyrene; acrylic homopolymers and copolymers; phenolics; alkyds; amino resins; siloxanes; epoxys; nylons; polyurethanes; phenoxys; polysulfanes; polycarbonates; polyesters and chlorinated polyesters; polyethers; acetals, polyimides; polyoxyethylenes, etc. Preferred are olefinic polymers.

A wide variety of conventional additives may be included in the polymer as is necessary, desirable or conventional. Such additives include catalysts, initiators, anti-oxidants (e.g., BHT), blowing agent, ultraviolet light stabilizers (e.g., HALS), organic pigments including tinctorial pigments, plasticizers, leveling agents, flame retardants, anti-cratering additives, and the like.

The following examples illustrate, but do not limit, this invention:

EXAMPLES 1–10

To demonstrate the effectiveness of the invention in suppressing discoloration of polymers pigmented with titanium dioxide and containing additives, measurements of delta b values were made for exhibits exposed to ultraviolet light for specified periods of time. The delta b values were measured by a Hunterlab color difference tester. Delta b represents the difference in color reflectivity of the samples. The exhibits were prepared as follows:

One hundred eighty five grams of "Alathon" 20 polyethylene resin (available from E. I. du Pont de Nemours and Company, Wilmington, Del., U.S.A.) were combined on a Bolling two-roll mill with 5.0 grams of either of the two standard titanium dioxide pigments studied. The acid of choice, in the amount of 0.1 gram, was then added to the mill at a 0.01 or 0.1 gram level. Finally, 0.6 gram of "Tinuvin 770" hindered amine light stabilizer and 0.6 gram of butylated hydroxytoluene (BHT) were added to the blend. The mixture was rolled into a sheet, pressed out on a pneumatic press and then placed in a controlled-environment light cabinet. The light cabinet had four type-F15T8/BLB lamps which had a total power input of 170 watts. The lamps emitted light in the ultraviolet spectrum, and the samples were located 25 centimeters from the lamps. Values of delta b were recorded over varying periods of time concluding at 122 hours total elapsed time.

Two standard titanium dioxide pigments were studied. Standard pigment A was a chloride process rutile titanium oxide pigment possessing no inorganic oxide surface treatment. Standard pigment B was a chloride process rutile titanium dioxide pigment possessing an inorganic surface treatment of 3.5% alumina and 1.0% silica.

Table I summarizes the results of the experiments. As stated earlier, standard pigment A is a rutile titanium dioxide pigment possessing no inorganic surface treatment. Such pigments have the greatest propensity to promote discoloration. Standard pigment B possesses an inorganic surface treatment and is somewhat less reactive than standard pigment A. The data given in Table I demonstrate that at the end of 122 hours the reactivity of standard pigment A (as measured by promotion of discoloration) was decreased by 22% by stearic acid, 20% by benzoic acid, 38% by malonic acid, and 72% by maleic acid. For standard pigment B, reactivity decreased by 46% for stearic acid, 60% for benzoic acid, 74% for malonic acid and 81% for maleic acid. The foregoing percentages were calculated directly from the delta b readings.

TABLE I
EFFECT OF VARIOUS ACIDS IN INHIBITING POLYMER DISCOLORATION

| Example | Delta B Measuremebts | | | |
|---|---|---|---|---|
| | 18 hrs | 36 hrs | 50 hrs | 122 hrs |
| 1 Untreated Standard A | 18.20 | 33.95 | 38.63 | 40.28 |
| 2 Standard A + Stearic Acid | 8.32 | 18.97 | 24.64 | 31.01 |
| 3 Standard A + Benzoic Acid | 8.27 | 17.63 | 23.15 | 31.96 |
| 4 Standard A + Malonic Acid | 5.50 | 11.29 | 15.71 | 31.96 |
| 5 Standard A + Malenic Acid | 2.42 | 4.63 | 6.19 | 11.40 |
| 6 Untreated Standard B | 2.87 | 8.65 | 13.05 | 25.04 |
| 7 Standard B + Stearic Acid | 0.85 | 2.91 | 5.36 | 13.60 |
| 8 Standard B + Benzoic Acid | 1.39 | 3.18 | 4.86 | 10.00 |
| 9 Standard B + Malonic Acid | 0.64 | 2.24 | 3.62 | 6.63 |
| 10 Standard B + Maleic Acid | 0.45 | 1.27 | 2.45 | 4.81 |

The invention claimed is:

1. Inorganic pigment coated with maleic, malonic, benzoic, fumaric or phthalic acid or mixtures thereof, said acid being present in the amount of about 0.01–6 percent, based on the weight of the inorganic pigment.

2. The pigment of claim 1 wherein the acid is maleic.

3. The pigment of claim 1 or 2 wherein the pigment is $TiO_2$.

4. Process for treating an inorganic pigment comprising contacting it with an organic acid of claim 1.

5. The process of claim 4 wherein the inorganic pigment is $TiO_2$.

6. A polymer incorporating the pigment of claims 1 or 2.

7. A polymer incorporating the pigment of claims 1 or 2 wherein the pigment is $TiO_2$.

8. A polymer or copolymer of one or more ethylenically unsaturated monomers incorporating the pigment of claims 1 or 2.

9. Polyethylene, polypropylene or polystyrene incorporating the pigment of claims 1 or 2.

* * * * *